United States Patent
Hull

(10) Patent No.: US 10,989,671 B2
(45) Date of Patent: Apr. 27, 2021

(54) METHOD AND SYSTEM FOR DETERMINING ALIGNMENT AND ORIENTATION OF A TARGET

(71) Applicant: THE BOEING COMPANY, Chicago, IL (US)

(72) Inventor: Jerald A. Hull, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 70 days.

(21) Appl. No.: 16/571,927

(22) Filed: Sep. 16, 2019

(65) Prior Publication Data
US 2021/0080405 A1    Mar. 18, 2021

(51) Int. Cl.
*G01N 21/956* (2006.01)
*G06F 17/11* (2006.01)
*G01N 21/88* (2006.01)

(52) U.S. Cl.
CPC ....... *G01N 21/956* (2013.01); *G01N 21/8806* (2013.01); *G06F 17/11* (2013.01); *G01N 2021/8848* (2013.01)

(58) Field of Classification Search
CPC ............. G01N 21/956; G01N 21/8806; G01N 2021/8848; G06F 17/11
USPC ....................................................... 382/141
See application file for complete search history.

(56) References Cited

U.S. PATENT DOCUMENTS

| | | | |
|---|---|---|---|
| 4,440,496 A | 4/1984 | Milana | |
| 7,800,758 B1* | 9/2010 | Bridges | G01C 3/08 |
| | | | 356/482 |
| 9,815,204 B2 | 11/2017 | Hull | |
| 2004/0092815 A1* | 5/2004 | Schweikard | A61B 6/12 |
| | | | 600/425 |
| 2008/0111985 A1* | 5/2008 | Bridges | G01B 11/002 |
| | | | 356/3.16 |
| 2014/0173870 A1* | 6/2014 | Otts | B23P 19/04 |
| | | | 29/407.1 |
| 2018/0208328 A1 | 7/2018 | Charlton et al. | |

OTHER PUBLICATIONS

U.S. Appl. No. 16/456,091, filed Jun. 28, 2019; entitled "Hole Location Targets and Measurement Systems, and Methods for Measuring a Location of a Hole".

(Continued)

*Primary Examiner* — Roy M Punnoose
(74) *Attorney, Agent, or Firm* — Alston & Bird LLP

(57) ABSTRACT

A method, system and computer program product are provided for position and orientation measurement using a camera system having an optical boresight centerline. Methods may include: receiving at an aperture a collimated input beam; splitting the input beam at a first surface including a beam splitter into a first sub-beam and a second sub-beam; receiving at a first sensor the first sub-beam; receiving at a second sensor the second sub-beam; and determining one or more offsets of the input beam from the centerline based on data received from the first sensor and the second sensor. Methods may include: determining a location and irradiance of the first sub-beam of the input beam received by the first sensor; and determining a location and irradiance of the second sub-beam of the input beam received by the second sensor.

30 Claims, 12 Drawing Sheets

(56) References Cited

OTHER PUBLICATIONS

U.S. Appl. No. 16/456,198, filed Jun. 28, 2019; entitled "Hole Location Targets and Measurement Systems, and Methods for Measuring a Location of a Hole".
U.S. Appl. No. 16/456,312, filed Jun. 28, 2019; entitled "Hole Location Targets and Measurement Systems, and Methods for Measuring a Location of a Hole".
Diffractive Optical Elements (DOE) | HOLOEYE Photonics AG [online] [retrieved Jan. 24, 2020]. Retrieved from the Internet: https://holoeye.com/diffractive-optics/ (dated 2018) 3 pages.
Duo Lateral PSDs | Position Sensing Detectors | Silicon Photodiodes | OSI Optoelectronics [online] [retrieved Jan. 28, 2020]. Retrieved from the Internet: https://web.archive.org/web/20190626181843/https://www.osioptoelectronics.com/standard-products/silicon-photodiodes/position-sensing-detectors/duo-lateral-psds.aspx (Jun. 26, 2019) 3 pages.
FaroArm®—Portable 3D Measurement Arm for any application [online] [retrieved Jan. 28, 2020]. Retrieved from the Internet: https://web.archive.org/web/20190710080102/https://www.faro.com/products/3d-manufacturing/faroarm. (Jul. 10, 2019) 12 pages.
Fixed Magnification Beam Expanders: UV Fused Silica [online] [retrieved Jan. 28, 2020] Retrieved from the Internet: https://www.thorlabs.com/newgrouppage9.cfm?objectgroup_id=2980 (1999-2020) 4 pages.
Handy Scan 3D Metrology Solutions [online ] [retrieved Jan. 28, 2020]. Retrieved from the Internet: https://www.creaform3d.com (2017) 7 pages.
Portable Measuring Arms | Hexagon Manufacturing Intelligence [online][retrieved Jan. 28, 2020]. Retrieved from the Internet: https://web.archive.org/web/20190708010731/https://www.hexagonmi.com/products/portable-measuring-arms. (Jul. 8, 2019) 4 pages.
Position Sensing Detectors | Standard Products | OSI Optoelectronics [online] [retrieved Jan. 28, 2020]. Retrieved from the Internet: https://www.osioptoelectronics.com/standard-products/silicon-photodiodes/position-sensing-detectors/position-sensing-detectors-overview.aspx (2013) 2 pages.
Powerful 3D depth sensing for every product [online] [retrieved Jan. 28, 2020]. Retrieved from the Internet: https://pmdtec.com/mwc. (Undated) 12 pages.
Understanding Waveplates and Retarders | Edmund Optics [online] [retrieved Jan. 28, 2020]. Retrieved from the Internet: https://edmundoptics.com/knowledge-center/application-notes/optics/understanding-waveplates (Undated) 13 pages.

* cited by examiner

METHOD AND SYSTEM FOR DETERMINING ALIGNMENT AND ORIENTATION OF A TARGET

TECHNICAL FIELD

A method, system and computer program product are provided in accordance with an example embodiment in order to identify a target location in space, and more particularly, to measure the six degrees of freedom of an optical target to a very high accuracy using an optical camera system.

BACKGROUND

Manufacturing, and particularly precision manufacturing required for industries such as the aerospace industry, requires accurate locating of workpieces, fixtures, and tools to perform various manufacturing operations and processes. Increasingly, robots are used to perform manufacturing functions that previously required manual alignment operations. However, the accuracy of the robotic work operation relies on an understanding of the location of workpieces relative to the robot and its associated tool or tools.

Orientation and alignment of a robot and a workpiece may conventionally be performed via coordinate measurement such as using a coordinate measuring machine or function of a robot. A tool may be aligned by a robot operator using a tool mounted camera to locate a particular feature, such as a hole or fiducial mark. Customarily, the camera is very slowly positioned close to the workpiece using numerically controlled program commands aided by manual intervention in order to accurately register a small feature against a cluttered background. However, the robotic arm on which the camera is located must be prevented from inadvertently contacting the workpiece or risk damage to any or all of the camera, the robotic arm, or the workpiece. This close proximity placement may involve the use of mechanical feelers or optical sensors, and time consuming visual inspection by the operator. When enough features have been semi-autonomously identified to derive the workpiece coordinate system in three dimensions of rotation and translation, the workpiece can be registered to the coordinate system of the robot and the operator can begin a fully autonomous robotic assembly operation, such as cutting, drilling, fastening, or welding. The semi-autonomous alignment operations described above are labor intensive and can add considerable time to the manufacturing operations cycle.

BRIEF SUMMARY

A method, system and computer program product are provided for aligning a target location in space, and more particularly, for measuring a target location within six degrees of freedom to a very high accuracy. Using a camera system to establish a target location according to example embodiments helps to improve the efficiency of precisely locating a target to facilitate machining, assembly, or other operations on a workpiece associated with the target.

In an example embodiment, a camera system is provided including: an aperture to receive a collimated input beam; an optical boresight having a centerline; a first sensor and a second sensor serially positioned relative to the centerline of the optical boresight; a first surface including a beam splitter configured to split the collimated input beam into a first sub-beam and a second sub-beam, and direct the first sub-beam of the input beam to the first sensor; a second surface including a reflective surface configured to reflect the second sub-beam and direct the second sub-beam to the second sensor; and a computing device in communication with the first sensor and the second sensor, the computing device configured to determine one or more offsets of the input beam from the centerline based on data received from the first sensor and the second sensor.

Within examples, the computing device of the camera system is configured to: determine a location and irradiance of the first sub-beam of the input beam received by the first sensor and determine a location and irradiance of the second sub-beam of the input beam received by the second sensor. The computing device of an example embodiment is configured to, based on data received from the first sensor and the second sensor, determine two translation offsets of the input beam from the centerline and two angle offsets of the input beam from the centerline. The computing device of an example embodiment is configured to, based on data received from the first sensor and the second sensor, determine two translation offsets of the input beam from the centerline and two angle offsets of the input beam from the centerline. According to some examples, the computing device is configured to determine two translation offsets of the input beam from the centerline and two angle offsets of the input beam from the centerline based on formulas, where the formulas use as input two-dimensional coordinates of the first sub-beam on the first sensor and two-dimensional coordinates of the second sub-beam on the second sensor.

According to some embodiments, the formulas use as inputs geometry of the camera system, such as the relationship between the first and second surfaces and the first and second sensors to determine the two translation offsets and the two angle offsets of the input beam from the centerline. The camera system of an example embodiment includes a laser module and diffractive optical element to project a ring for aligning the optical boresight with the input beam. The camera system of an example embodiment includes a beam condenser positioned between the aperture and the first surface to receive the input beam thereby increasing the capture area of the input beam entering the aperture. The first sensor of an example embodiment is positioned adjacent to the first surface, and the second sensor positioned adjacent to the second surface.

The camera system of some embodiments includes a second surface with a linearly polarized beam splitter, where the aperture is positioned at a first end of the camera system. The camera system of an example embodiment includes: a laser source positioned at a second end of the camera, opposite the aperture; and a collimating optic, where the collimating optic is positioned to direct a collimated output beam toward the linearly polarizing beam splitter, and where the linearly polarizing beam splitter directs a portion of the collimated beam toward the beam splitter through which passes a portion of the collimated beam. According to an example embodiment, a quarter wave plate is disposed proximate the aperture, where the linearly polarizing beam splitter includes a linear polarizing P-pass coating and the first surface includes a half-mirror coating. The collimated output beam of an example embodiment is randomly polarized before passing through the P-pass coating, where a P-aligned output beam passes through the P-pass coating of which half of the P-aligned output beam passes through the half-mirror coating to exit the camera system through the quarter wave plate as an output beam of clockwise circularly polarized waves. A reflection of the output beam of clockwise circularly polarized waves of an example embodiment includes an input beam of counter-clockwise circularly polarized waves received through the quarter wave plate to become an input beam of S-aligned waves, where half of the S-aligned waves of the input beam are reflected from the half-mirror coating to the first sensor and half of the S-aligned waves pass through the half-mirror coating to reach the P-pass coating of the second surface, where the half of the S-aligned waves that reach the P-pass coating are reflected to the second sensor.

According to some embodiments, at least one of the first sensor and the second sensor includes a pixelated imager and a time-of-flight pixelated sensor, where the computing device may be configured to determine distance of the camera system from a target based on data obtained by the time of flight pixelated sensor in response to modulation of the laser source.

In another example, a method for position and orientation measurement using a camera system having an optical boresight centreline is described. The method includes: receiving at an aperture a collimated input beam; splitting the input beam at a first surface including a beam splitter into a first sub-beam and a second sub-beam; receiving at a first sensor the first sub-beam; receiving at a second sensor the second sub-beam; and determining one or more offsets of the input beam from the centerline based on data received from the first sensor and the second sensor. In an example, the method includes: determining a location and irradiance of the first sub-beam of the input beam received by the first sensor; and determining a location and irradiance of the second sub-beam of the input beam received by the second sensor. In an example, the method includes determining two translation offsets of the input beam from the centerline and two angle offsets of the input beam from the centerline based on data received from the first sensor and the second sensor.

According to an example embodiment, determining the two translation offsets of the input beam from the centerline and two angle offsets of the input beam from the centerline based on data received from the first sensor and the second sensor includes: identifying on the first sensor a two-dimensional coordinate location of the first sub-beam; identifying on the second sensor a two-dimensional coordinate location of the second sub-beam; using the two-dimensional coordinate location of the first sub-beam and the two-dimensional coordinate of the second sub-beam as inputs to formulas for each of the two translation offsets and each of the two angle offsets; and solving the formulas to obtain the two translation offsets and the two angle offsets. In an example, the formulas for the two translation offsets and the two angle offsets are established based on a geometry of the camera system. In another example, the method includes projecting, with a laser module and a diffractive optical element, a ring for coarse aligning the optical boresight with the input beam.

According to an example embodiment, the method includes: projecting a collimated output beam through the first surface and the second surface, and through a quarter wave plate to polarize the output beam as one of clockwise circularly polarized waves or counter-clockwise circularly polarized waves, where receiving, at the aperture, the collimated input beam may include receiving, at the aperture, the collimated input beam reflected from a target as the other of clockwise circularly polarized waves or counter-clockwise circularly polarized waves through the quarter wave plate to align the collimated input beam polarization. An example method includes: determining an angular offset of at least one of the first sub-beam or the second sub-beam relative to the respective first sensor or second sensor in response to the first sub-beam or the second sub-beam having a non-axis symmetrical beam cross section, where the angular offset is derived from a major axis of the non-axis symmetrical beam cross section with respect to a coordinate system of the respective first sensor or second sensor.

In another example, a computer program product for position and orientation measurement is described. The computer program product has at least one non-transitory computer-readable storage medium having computer-executable program code instructions stored therein. The computer-executable program code instructions including program code instructions to: receive, at a first sensor, a first sub-beam of a collimated input beam received through an aperture; receive at a second sensor a second sub-beam of the collimated input beam; determine a location and irradiance of the first sub-beam of the input beam received by the first sensor; determine a location and irradiance of the second sub-beam of the input beam received by the second sensor; and determine one or more offsets of the input beam from the centerline based on data received from the first sensor and the second sensor.

The computer program product of some embodiments includes program code instructions to project, with a laser module and a diffractive optical element, an incident illumination pattern such as a ring as a visual aid for coarse aligning the optical boresight with the input beam. According to some embodiments, the program code instructions to determine one or more offsets of the input beam from the centerline based on data received from the first sensor and the second sensor includes program code instructions to determine two translation offsets of the input beam from the centerline and two angle offsets of the input beam from the centerline based on data received from the first sensor and the second sensor. The computer program product of some embodiments includes program code instructions for using time-of-flight data from at least one of the first sensor or the second sensor to identify at least one further offset from a range measurement to the target.

In another example, a camera system for position and orientation measurement is described. The camera system includes: a camera system housing including a boresight centerline; a laser source proximate a first end of the camera system housing along the boresight centerline; a quarter wave plate proximate a second end of the housing along the boresight centerline; a collimated optic disposed between the laser source and the quarter wave plate along the boresight centerline; a first surface including a half-mirror coating arranged at an angle relative to the boresight centerline and positioned between the collimating optic and the quarter wave plate; a second surface including a linearly polarized coating arranged at an angle relative to the boresight centerline and positioned between the collimated optic and the first surface; a first sensor configured to receive an input beam reflected from the first surface; and a second sensor configured to receive the input beam reflected from the second surface.

According to some embodiments, the linearly polarized coating is a P-pass coating, where an output beam emitted from the laser is randomly polarized before passing through the P-pass coating, where a P-aligned output beam passes through the P-pass coating of which half of the P-aligned output beam passes through the half-mirror coating to exit the camera system through the quarter wave plate as an output beam of clockwise circularly polarized waves. In an example embodiment, a reflection of the output beam of clockwise circularly polarized waves includes an input beam of counter-clockwise circularly polarized waves received through the quarter wave plate to become an input beam of S-aligned waves, where half of the S-aligned waves of the input beam are reflected from the half-mirror coating to reach the P-pass coating of the second surface, where the half of the S-aligned waves that reach the P-pass coating are reflected to the second sensor. In an example embodiment, the camera system includes a computing device to identify two translation offsets and two angular offsets of a target in response to an input beam reflected from the target being received at the first sensor and the second sensor. Causing the computing device to identify two translation offsets and two angular offsets of a target is performed in response to identifying coordinates of the input beam received at the first sensor and coordinates of the input beam received at the second sensor, and calculating the two translation offsets and the two angular offsets based on the geometry of the camera system.

BRIEF DESCRIPTION OF THE DRAWINGS

Figure 1:
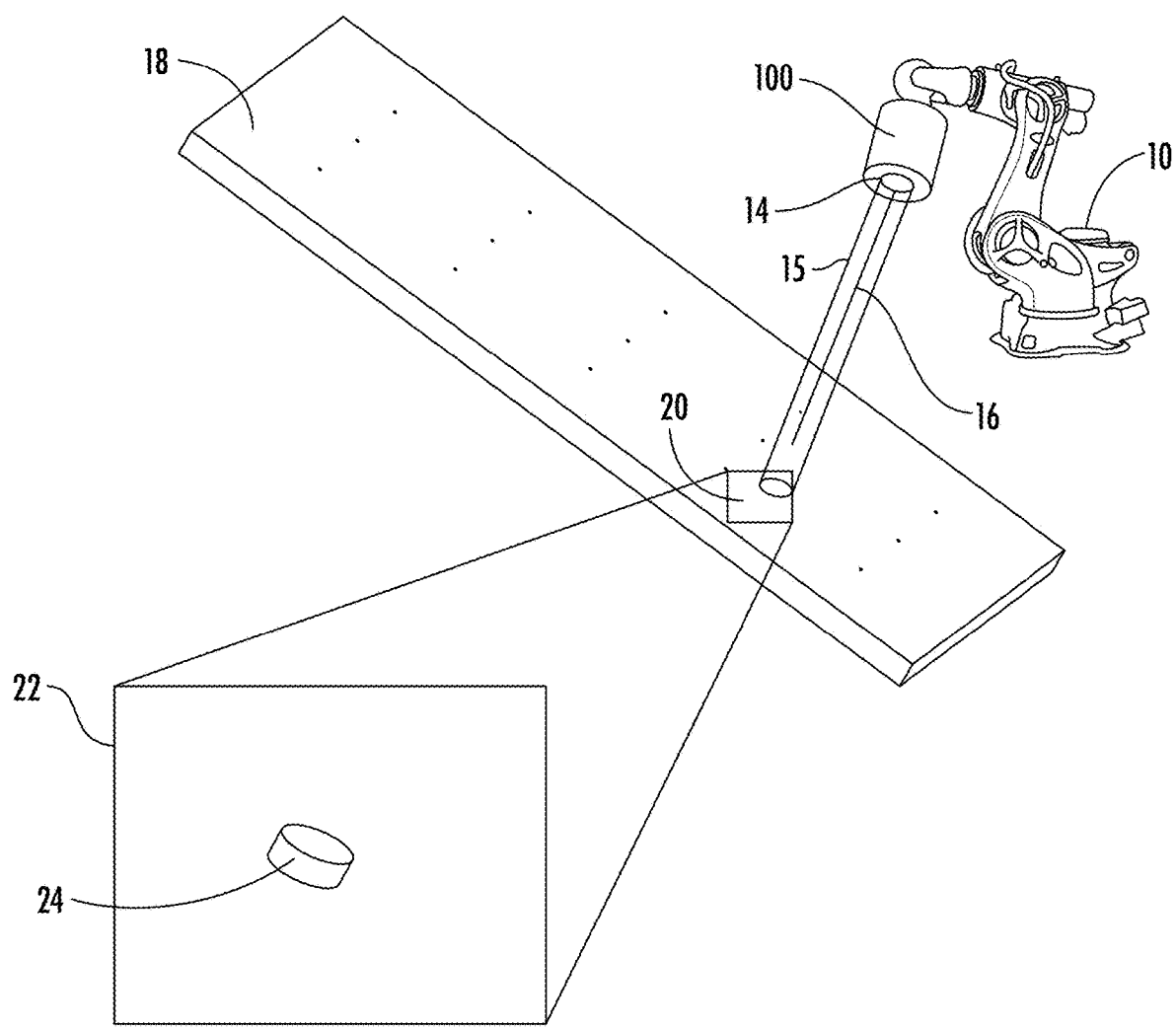
Figure 2:
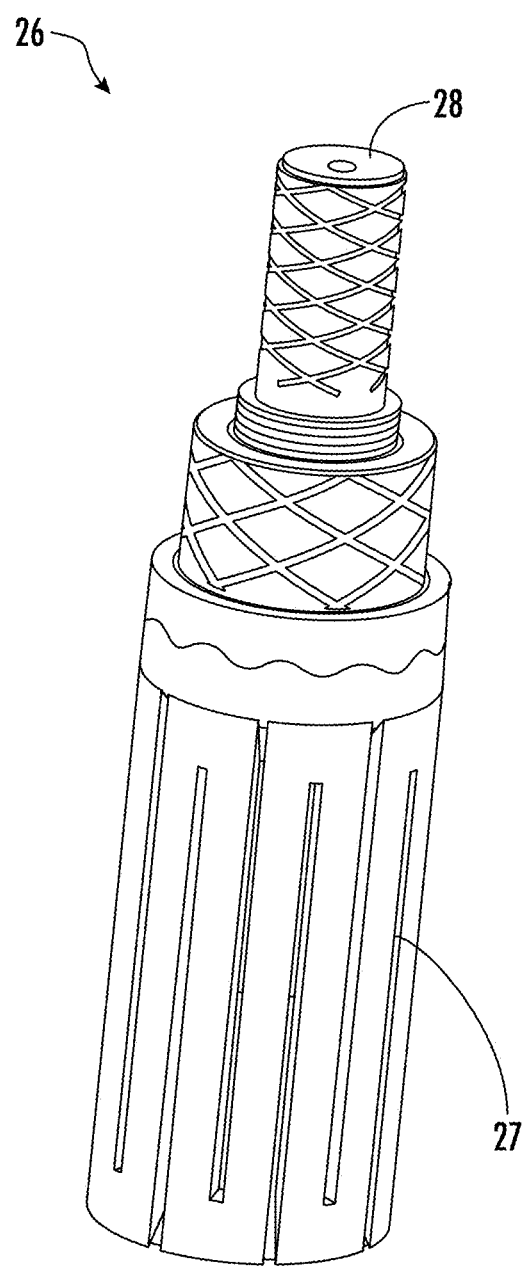
Figure 3:
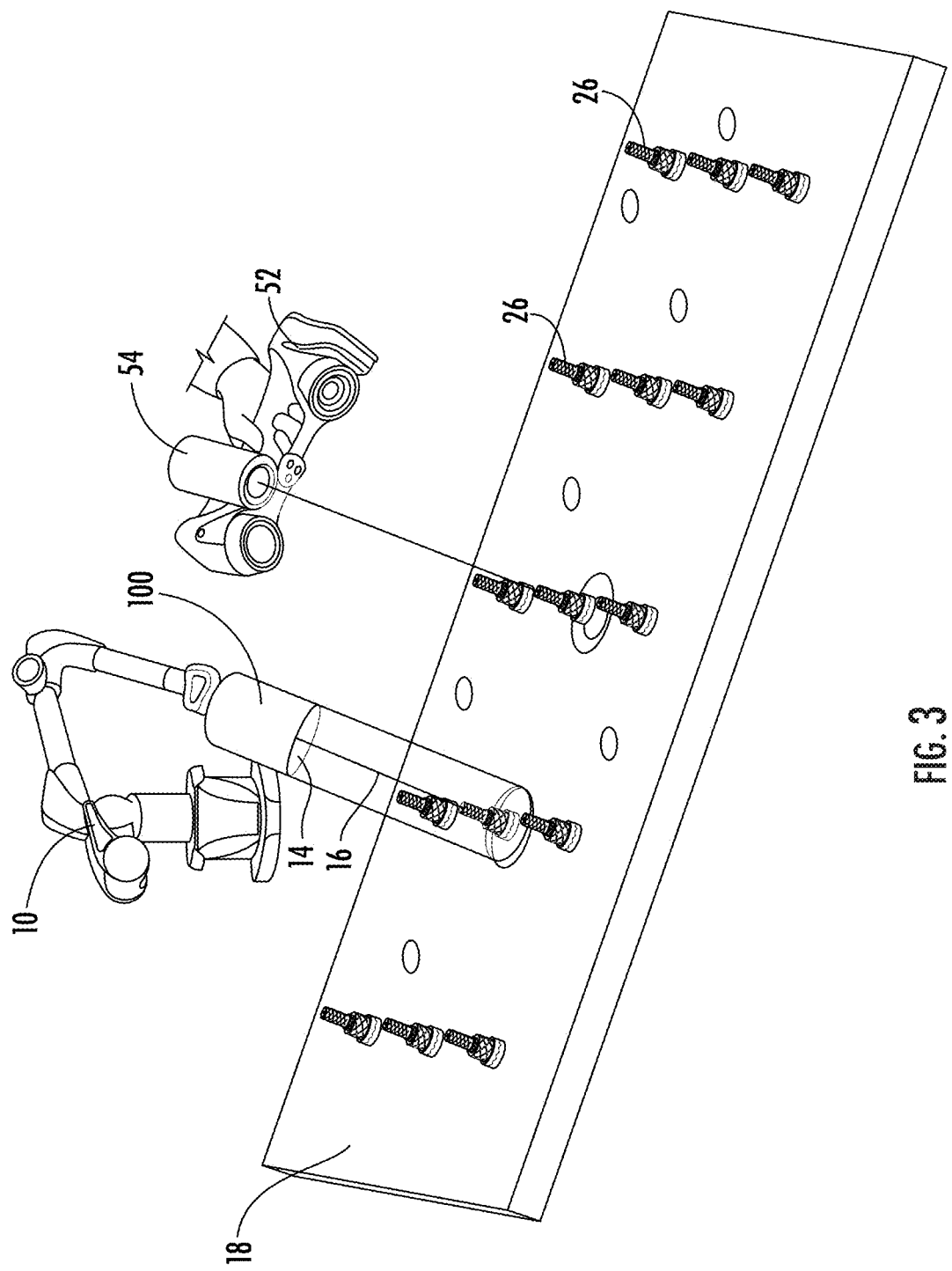
Figure 4:
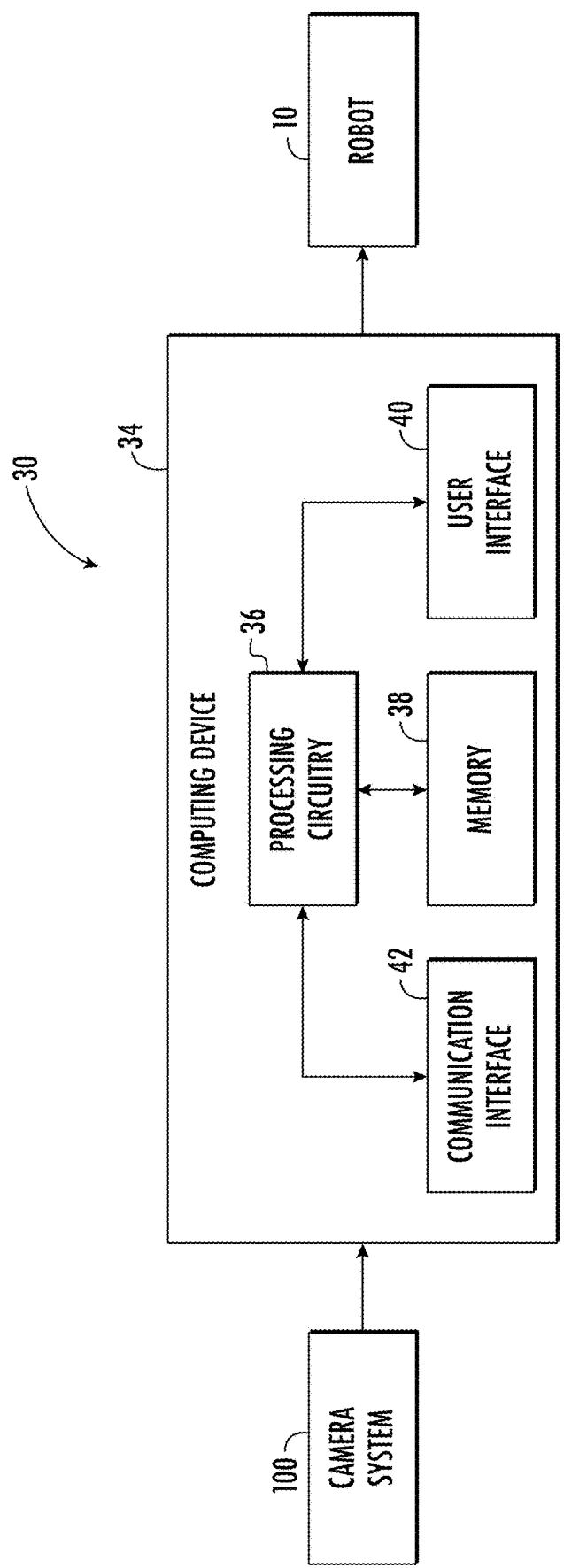
Figure 5:
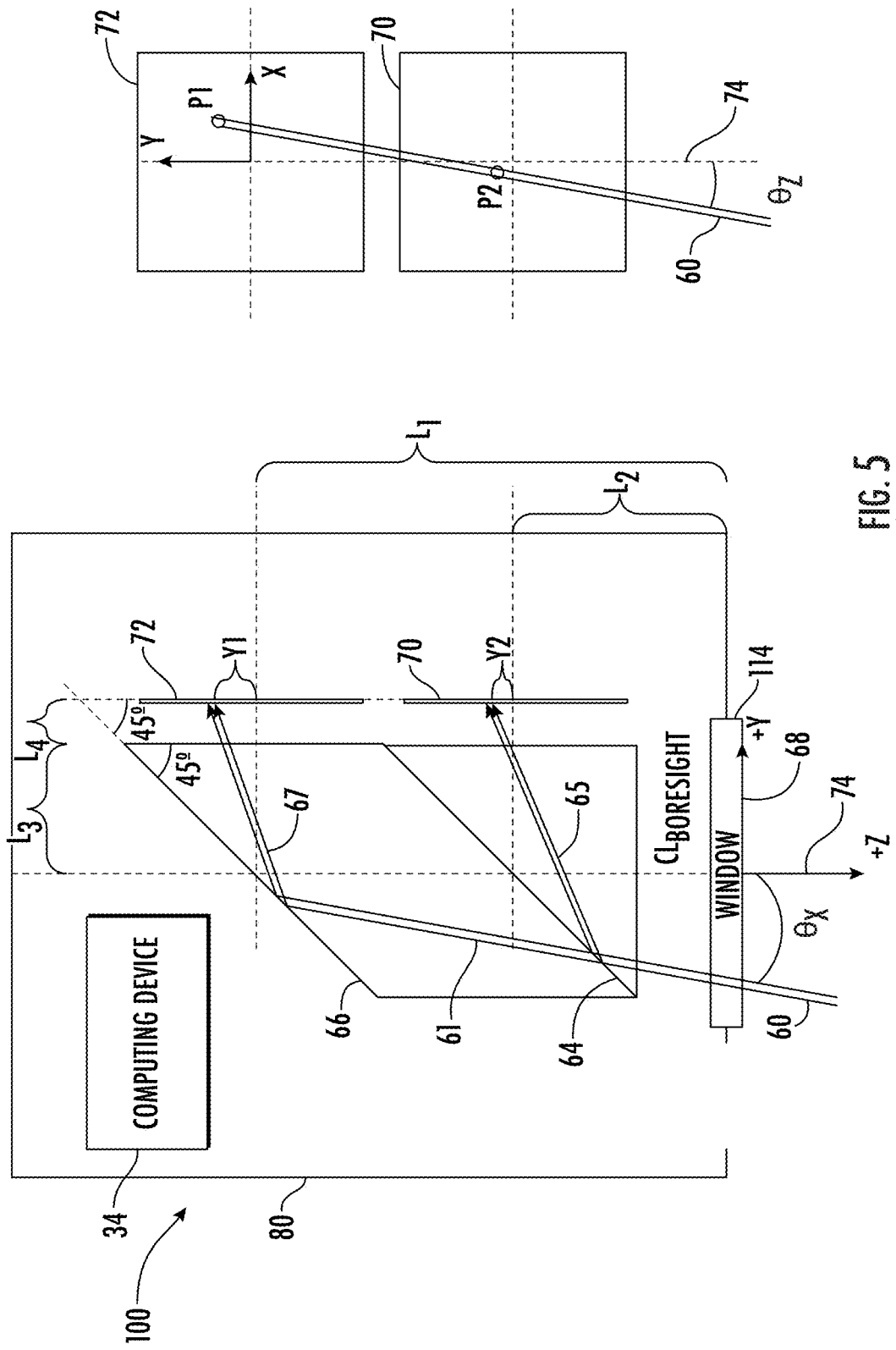
Figure 6:
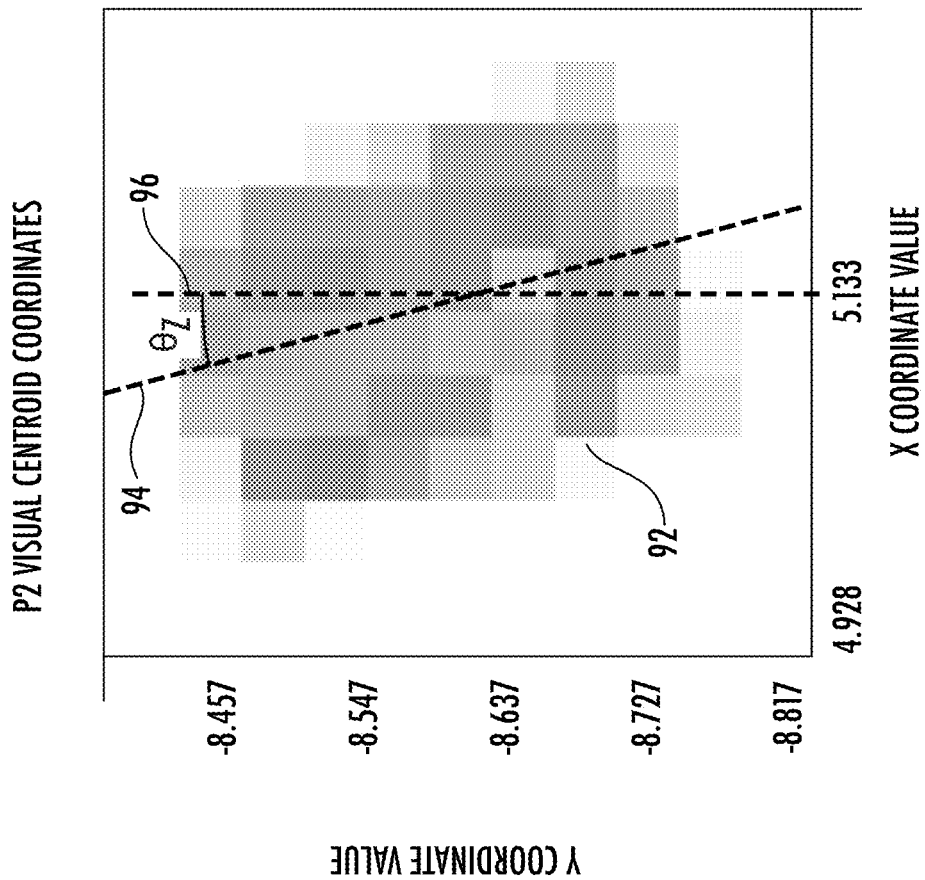
Figure 6:
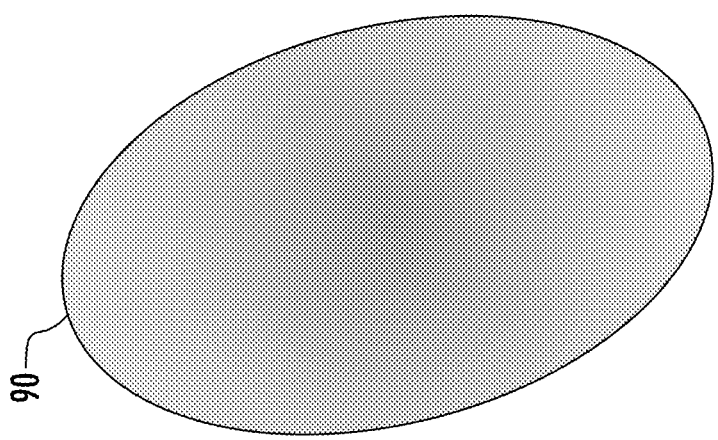
Figure 7:
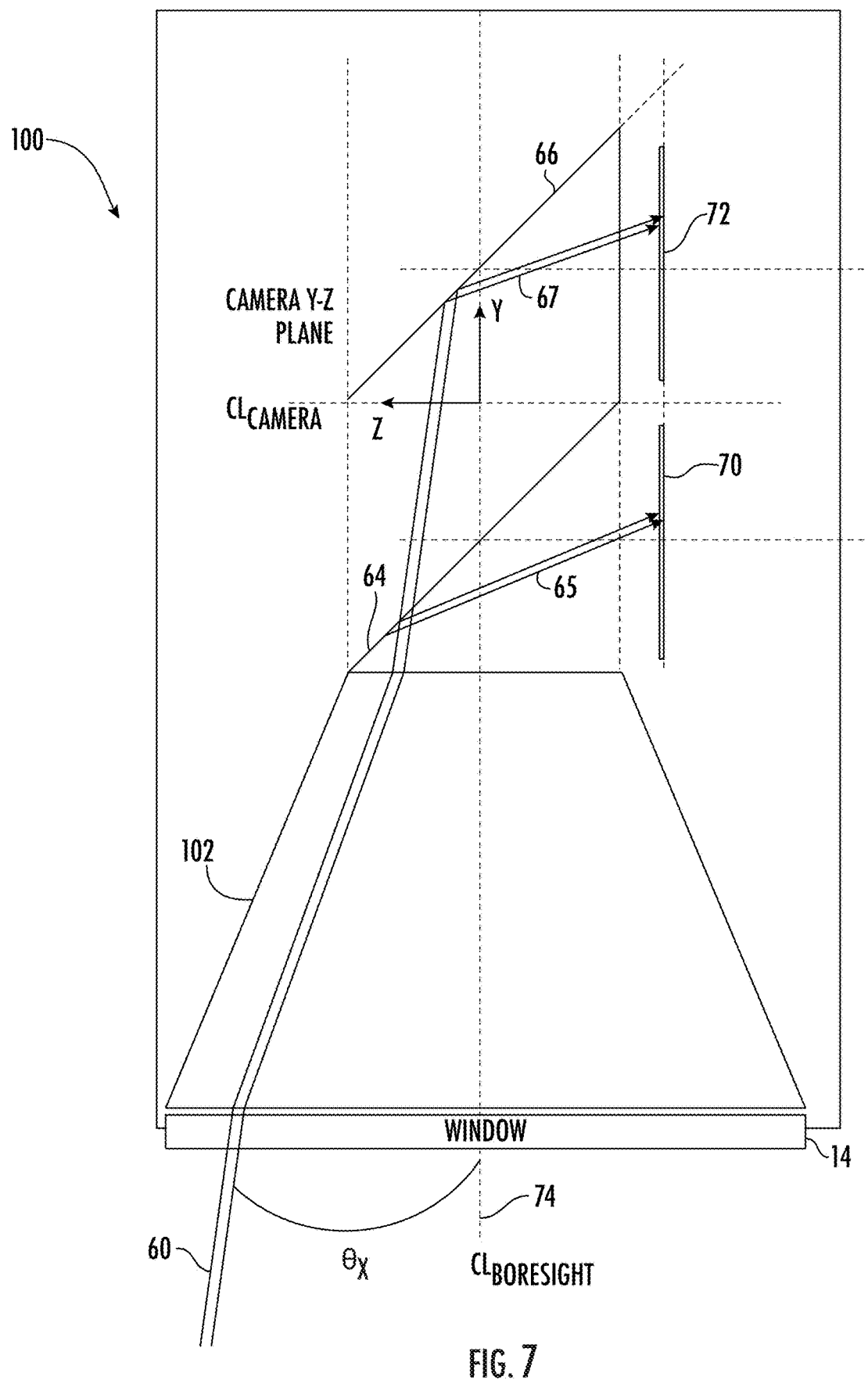
Figure 8:
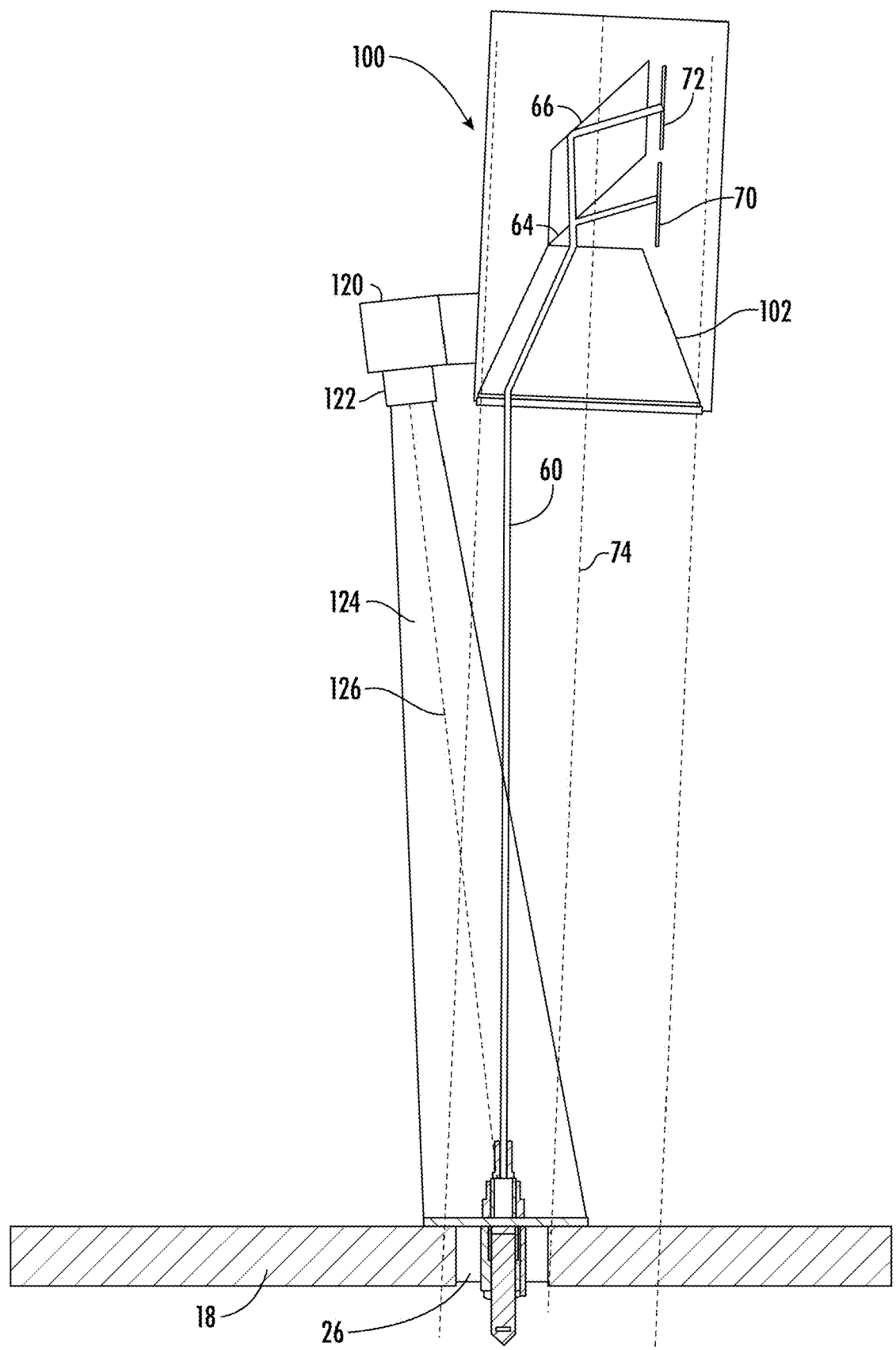
Figure 9:
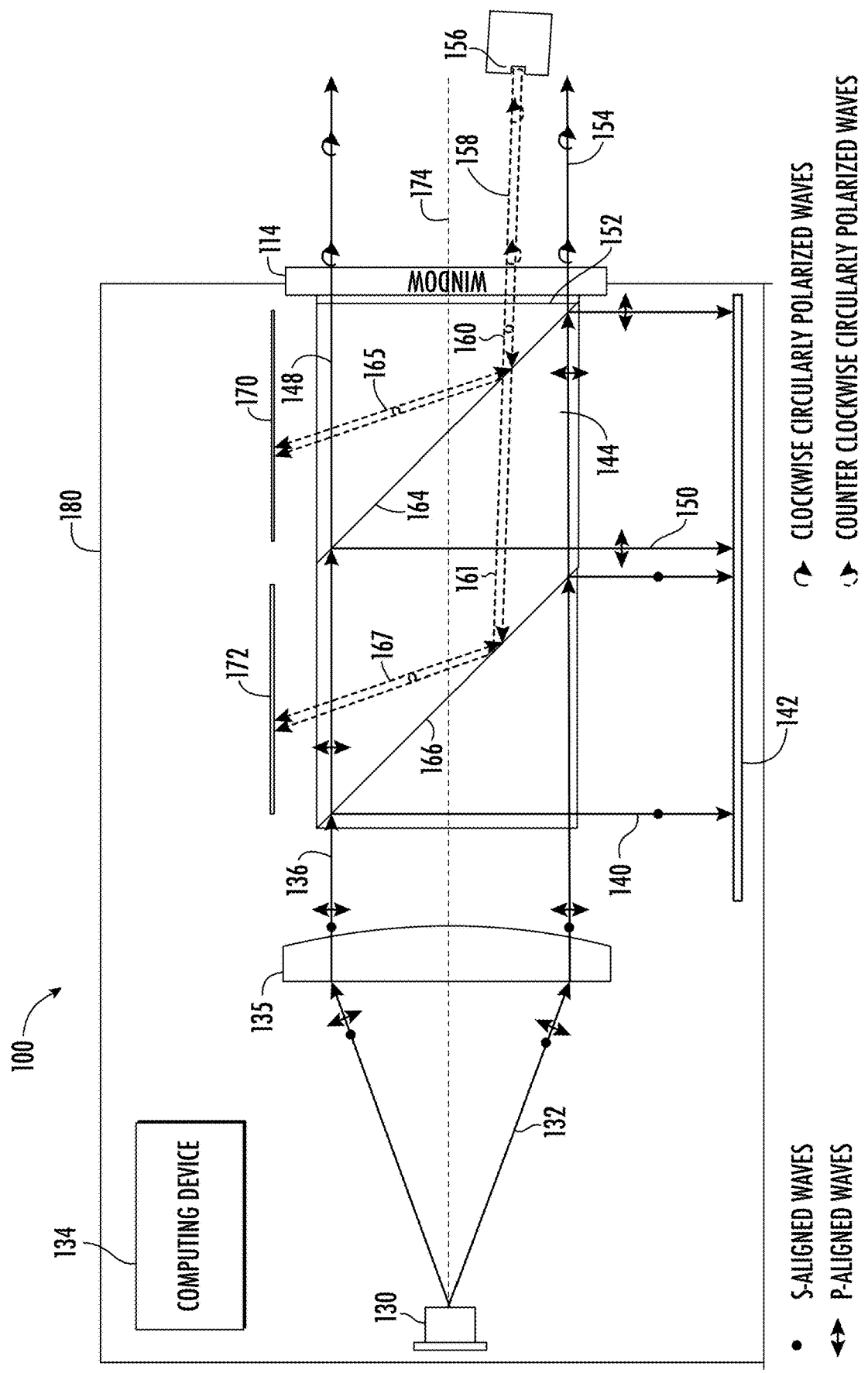
Figure 10:
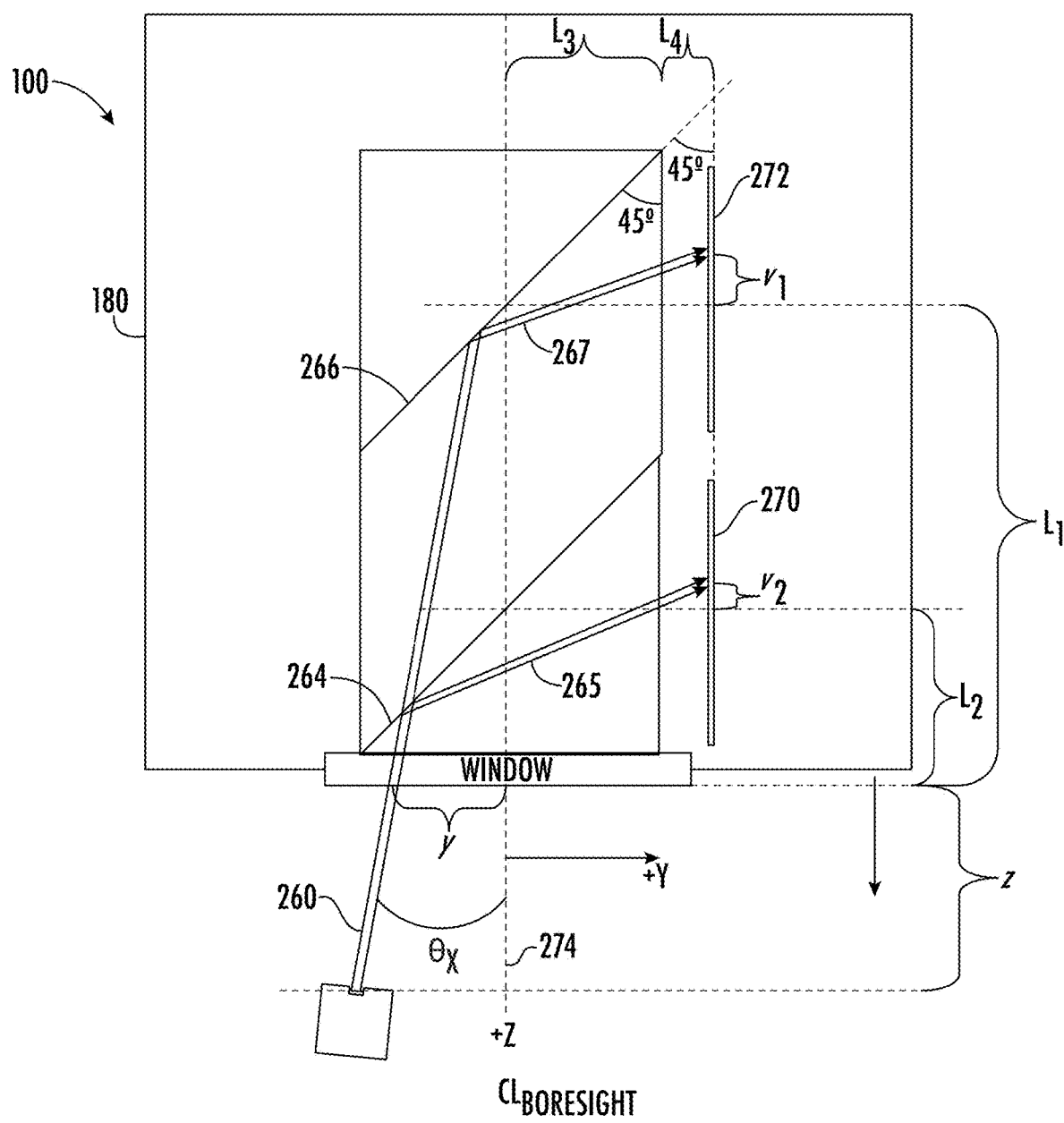
Figure 11:
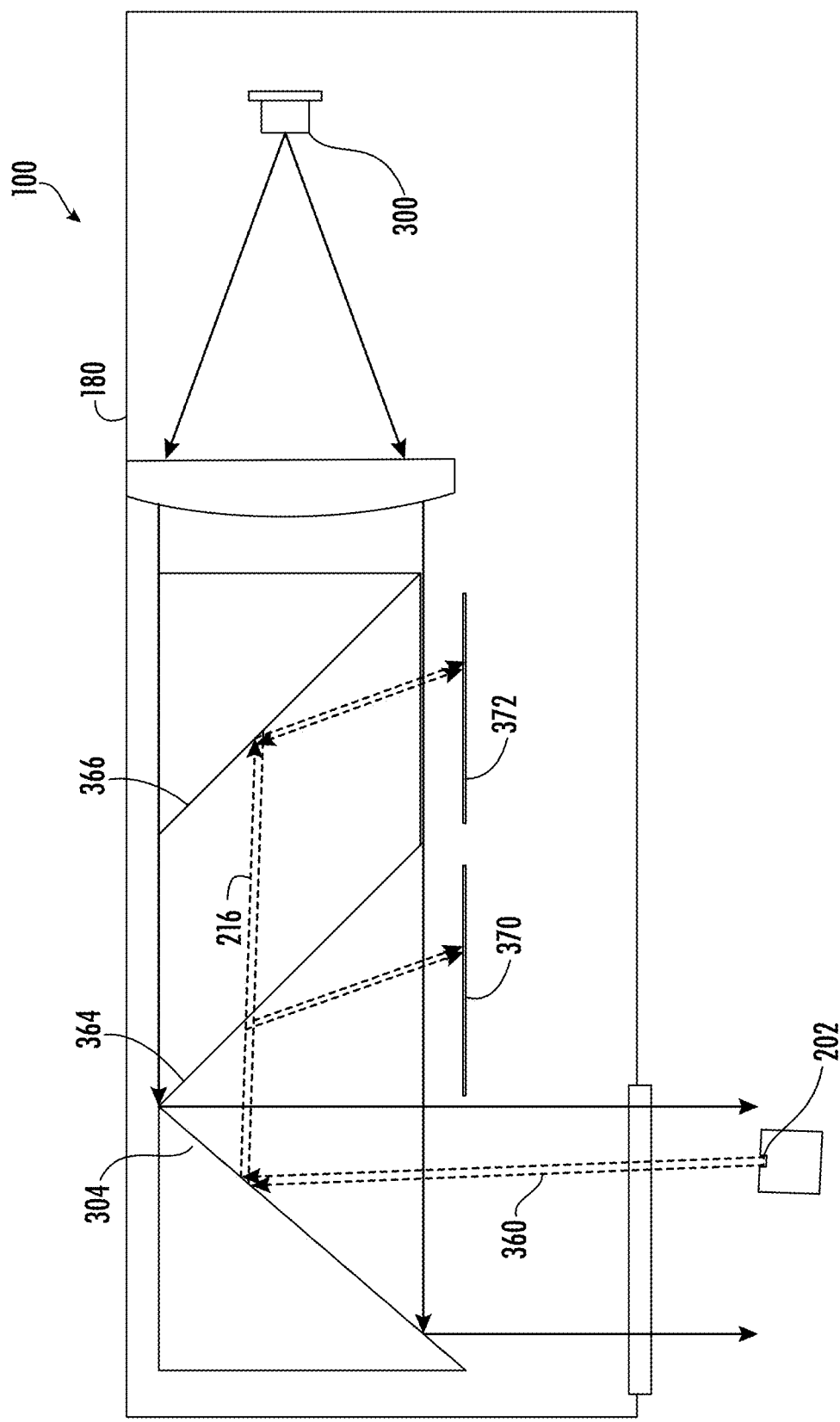
Figure 12:
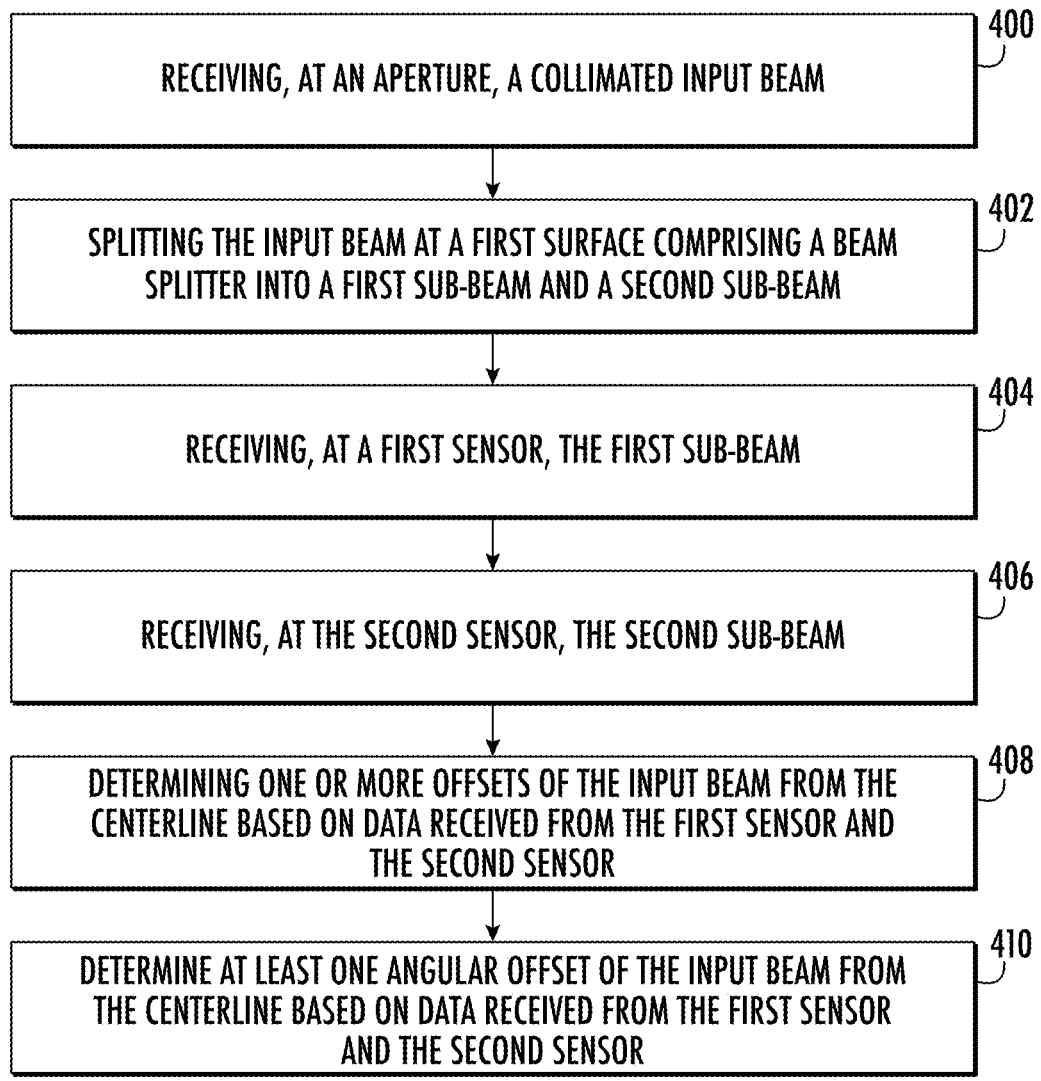

Having thus described certain example embodiments of the present disclosure in general terms, reference will hereinafter be made to the accompanying drawings which are not necessarily drawn to scale, and wherein:

FIG. 1 is a representation of a camera system attached to an end effector of a robot trained on workpiece according to an example embodiment of the present disclosure;

FIG. 2 is a self-aligned bore emitting device according to an example embodiment of the present disclosure;

FIG. 3 is an illustration of a robot-mounted camera system and a hand-held camera system trained on a workpiece according to an example embodiment of the present disclosure;

FIG. 4 is a block diagram of a control system for high precision measurement using a camera system according to an example embodiment of the present disclosure;

FIG. 5 illustrates a configuration of optics within a camera system according to an example embodiment of the present disclosure;

FIG. 6 depicts a non-axis symmetrical beam as detected by a sensor of a camera system according to an example embodiment of the present disclosure;

FIG. 7 illustrates another configuration of optics within a camera system according to an example embodiment of the present disclosure;

FIG. 8 illustrates an arrangement of a camera system and a laser including a diffractive optical element according to an example embodiment of the present disclosure;

FIG. 9 illustrates a camera system and configuration of optics within a camera system according to an example embodiment of the present disclosure;

FIG. 10 illustrates another configuration of optics within a camera system according to an example embodiment of the present disclosure;

FIG. 11 illustrates still another configuration of optics within a camera system according to an example embodiment of the present disclosure; and FIG. 12 is a flowchart of a process for precision measurement within up to six degrees of freedom according to an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A method, system, and computer program product are provided in accordance with an example embodiment described herein to accurately and efficiently measure up to six degrees of freedom of an optical target to accuracies of 0.001-inches and 0.02 degrees or smaller with a single monostatic camera measurement. The system of an example embodiment includes an optical camera assembly to emit a light beam, such as a collimated laser beam of a cross section several times larger than a small target mirror configured to reflect a beamlet back into the optical assembly. The optical assembly of an example splits and measures the returned sub-beams with at least two sensors. Embodiments provided herein enable measurement largely independent of a distance between the optical assembly and a target.

Embodiments of the present disclosure use a high precision camera while not requiring a robot to be of such high precision. The high precision camera, together with the optical assembly enables positioning and orientation measurement within six degrees of freedom of a relatively small target, such as a target mirror, embedded within a work piece to less than 0.001 inches and 0.02 degrees, respectively about the key axes. When hosted on a coordinate measuring machine (CMM), devices of example embodiments allow efficient hole center and direction vector measurement of holes with allowable build variation, and in cramped quarters for adaptive machining operations.

The system of example embodiments provided herein include a camera having an aperture to receive a collimated input beam. The collimated input beam of an example embodiment has a waist dimension substantially smaller than the aperture dimension. The camera includes an optical boresight having a centerline and a first and second sensor serially positioned relative to the centerline of the optical boresight. The camera includes optics for beam splitting to split the collimated input beam into a first portion and a second portion, while directing the first portion of the beam to the first sensor and the second portion of the beam to a second sensor. A computing device in communication with the first and second sensors is used to determine one or more offsets of the input beam from the centerline based on data received from the sensors. This configuration enables precise locating of the target, where the target is the source of the input beam, either through reflection of a collimated output beam from a target mirror, or as a laser source, such as using a self-aligned bore emitting device to emit an input laser beam as will be described further below.

One example of a system of embodiments described herein is depicted in FIG. 1. As shown, a robot 10 which may be a low accuracy robotic system relative to the accuracy of the measurement system described herein which manipulates an end effector including the camera system 100. A workpiece 18 including a very small reflective surface 24 such as a polished magnet embedded in the workpiece 18 shown through enlarged view 22 of area 20 of the workpiece 18. The robot may move the end effector and camera system 100 such that the very small reflective surface 24 is within the field of view of the camera system 100. The field of view of an example embodiment is based on the aperture 14 area of the camera system; however, an optional beam expander/condenser expands the field of view to capture a greater surface area in the field of view as described further below. The camera system 100 receives the reflected laser beam 16 reflected from the reflective surface 24 and derives four to six degrees of freedom to a very high precision with respect to the fixed camera frame.

As shown in the embodiment of FIG. 1, the reflective surface 24 reflects a laser beam from a collimated output beam 15 emitted from the camera system 100 for measurement. The reflected laser beam according to an example embodiment is a beamlet, or a beam that is smaller than a collimated output beam which enables some margin of error when aligning the collimated output beam 15 with the reflective surface 24. However, embodiments described herein optionally receives a laser beam generated from a precision device used to align a hole bore in order to measure the location of the device. While the camera system 100 of FIG. 1 may be used to measure the position of an object, such as the very small reflective surface 24, in other examples the camera system measures a beam that is generated from a self-aligned bore emitting device. A self-aligned bore emitting device may be used to generate a beam that is centered within a hole such that the centerline of the hole may be accurately measured by embodiments described herein.

FIG. 2 illustrates an example embodiment of a self-aligned bore emitting device 26 that includes a device body 27 configured to be received in and self-aign to a bore, and an emitting end 28 configured to emit a beam axially aligned with the bore. FIG. 3 illustrates a workpiece 18 including a plurality of bore holes into which self-aligned bore emitting devices have been received. As shown, the measurement system of the illustrated embodiment includes a robot 10 with a camera system 100 including aperture 14 and beamlet 16, where beamlet 16 is received from a self-aligned bore emitting device of the workpiece 18. The camera system 100 can also be attached to a hand-held optical system. For instance, also shown in FIG. 3 is a hand-held optical system 52 that uses a camera system 54 (which, in example embodiments, corresponds to camera system 100) to measure the location of a bore into which a self-aligned bore emitting device is received in four to six degrees of freedom with respect to the camera system coordinate frame. While the depicted embodiment of FIG. 3 includes self-aligned bore emitting devices, embodiments may optionally include a self-aligned bore device that does not emit its own beam, but instead includes a mirrored surface or reflective surface in place of an emitted beam in order to reflect a beam generated by camera systems as described above with respect to FIG. 1.

Referring now to FIG. 4, a control system for high precision measurement is depicted. As shown, the system includes a camera system 100, which is illustrated and described in greater detail below including the sensor arrangement. The camera system 100 is configured to capture locations of the input beams on the two serialized sensors of the sensor arrangement. In addition to the camera system 100, the control system 30 of FIG. 4 includes a computing device 34 configured to analyze the sensor information from the sensors of the camera system to precisely locate the target in four to six degrees of freedom at a very high accuracy. As also shown in FIG. 4, the control system 30 of an example embodiment includes or is in communication with a robot 10 and, more particularly, a robotic end effector that is used to advance the camera system 100 to obtain a target within the aperture or field of view by the computing device 34.

The computing device 34 may be configured in various manners and, as such, may be embodied as a personal computer, a tablet computer, a computer workstation, a mobile computing device such as a smartphone, a server or the like. Regardless of the manner in which the computing device 34 is embodied, the computing device of an example embodiment includes or is otherwise associated with processing circuitry 36, memory 38, and optionally a user interface 40 and a communication interface 42 for performing the various functions herein described. The processing circuitry 36 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 36 is configured to execute instructions stored in the memory 38 or otherwise accessible to the processing circuitry. These instructions, when executed by the processing circuitry 36, may cause the computing device 34 and, in turn, the system 30 to perform one or more of the functionalities described herein. As such, the computing device 34 may comprise an entity capable of performing operations according to an example embodiment of the present disclosure while configured accordingly. Thus, for example, when the processing circuitry 36 is embodied as an ASIC, FPGA or the like, the processing circuitry and, correspondingly, the computing device 34 may comprise specifically configured hardware for conducting one or more operations described herein. Alternatively, as another example, when the processing circuitry 36 is embodied as an executor of instructions, such as may be stored in the memory 38 the instructions may specifically configure the processing circuitry and, in turn, the computing device 34 to perform one or more algorithms and operations described herein.

The memory 38 may include, for example, volatile and/or non-volatile memory. The memory 38 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 38 may comprise any non-transitory computer readable storage medium. The memory 38 may be configured to store information, data, applications, instructions, or the like for enabling the computing device 34 to carry out various functions in accordance with example embodiments of the present disclosure. For example, the memory 38 may be configured to store program instructions for execution by the processing circuitry 36.

The user interface 40 may be in communication with the processing circuitry 36 and the memory 38 to receive user input and/or to provide an audible, visual, mechanical, or other output to a user. As such, the user interface 40 may include, for example, a display for providing an image captured by the camera system 100. Other examples of the user interface 40 include a keyboard, a mouse, a joystick, a microphone and/or other input/output mechanisms.

The communication interface 42 may be in communication with the processing circuitry 36 and the memory 38 and may be configured to receive and/or transmit data. The communication interface 42 may include, for example, one or more antennas and supporting hardware and/or software for enabling communications with a wireless communication network. Additionally or alternatively, the communication interface 42 may include the circuitry for interacting with the antenna(s) to cause transmission of signals via the antenna(s) or to handle receipt of signals received via the antenna(s). In some environments, the communication interface 42 may alternatively or also support wired communication.

FIG. 5 illustrates a configuration of optics within the camera system 100 including housing 80 for locating a target, which in the instant embodiment, is the source of a generated beam 60. As shown, a beam 60 is received through an optic element window 68 into the camera system housing 80. The optic element of an example embodiment is a lens for concentrating the beam to accommodate a larger field of view as described below, or merely a window at the aperture 114 through which the beam passes into the optics of the camera system housing 80. The camera system of an example embodiment is equipped or in communication with the computing device 34, as depicted in FIG. 5. The computing device 34 in communication with the sensors 70, 72 of the camera system, including the processing circuitry 36, user interface 40, memory 38, communication interface 42, may be contained within the camera housing, or outside the camera housing. The beam 60 received into the optics of the illustrated embodiment strikes a half-mirror 64 arranged at an angle relative to the centerline of the boresight 74. The boresight is the axis along which the optics are arranged and passes through the center of the mirrors of the optics. The angle of the half-mirror 64 of the illustrated embodiment is at 45-degrees relative to the centerline of the boresight 74 as shown in FIG. 5, though other angles are possible provided the angle is accounted for in the formulas including the geometry of the camera system optics and with respect to the sensors for calculating target location.

As shown, the beam 60 received at the half-mirror surface 64 is partially reflected along sub-beam 65 to first sensor 70. The half-mirror 64 or beam-splitter is a half-mirror or a mirror with 50% opacity to reflect some of the incoming beam while allowing at least a portion of the beam to pass through the mirror 64. While the mirror 64 is referred to as a "half-mirror" the opacity may not be exactly 50%, and a wide range of opacity may be used. However, to maximize the portion of the beams received on each of the sensors, a half-mirror of about 50% opacity is preferred to provide a balance of beam intensity to the two sensors. The portion of the beam that passes through the half-mirror along path 61 reaches a second mirror of a second surface 66 which reflects the second sub-beam 67 to reach the second sensor 72. The locations of the mirrors and the sensors with respect to one another are well defined such that they cooperate to identify the location of the target.

The sub-beams 65 and 67 received at the first sensor 70 and second sensor 72, respectively, provide the sensed information necessary to precisely locate the target. The sensors of some example embodiments include imaging sensors that identify a two-dimension lateral position of the sub-beams received at the sensors. The sensors within the camera system housing 80 of FIG. 5 are shown in profile such that they are in a plane orthogonal to the two-dimensional view of FIG. 5. The sensors are also shown in plan view in FIG. 5 extracted from the camera system housing 80, illustrating the location P1 on which sub-beam 67 reaches the second sensor 72, and location P2 where the sub-beam 65 reaches the first sensor 70, along the angle $\theta_x$ of the beam 60 relative to the centerline of the boresight 74. The markers for the locations of P1 and P2 are shown enlarged relative to their scale with respect to the sensors for visibility.

In order to locate the target, calculations of the beam positions on the sensors are necessary. The camera coordinate system is defined to have origin at the window 68 and Z-axis along the boresight centerline 74. The X and Y axes are illustrated in the plan view of the second sensor 72 such that the sensor lies along the X-Y plane. The sensor coordinate systems may be left-handed due to the mirroring of the beams and correspond to a virtual sensor affixed directly behind the window 68 such that the positive Y axis direction is toward the arrow shown in the Y-axis of the second sensor's plan view and the positive X axis direction is shown in the X-axis of the second sensor's plan view. The beam of an example embodiment is parameterized as (x, y, α, β), where angular offsets $\alpha=-\tan(\theta_x)*n$ and $\beta=\tan(\theta_y)*n$. Thus, angular offsets α and β have the same sign as the projection of the beam onto the X-Y plane. The index of refraction, n, affects angle of incidence and not trans offset. Letting ($u_1$, $v_1$) be the coordinate where incident sub-beam 65 strikes the first sensor 70, and let ($u_2$, $v_2$) be the coordinate where incident sub-beam 67 strikes the second sensor 72, the following formulas are used:

$$u_1 = x - \beta\{(L_1+L_3)/n + L_4\} \qquad (1)$$

$$v_1 = y - \alpha\{(L_1+L_3)/n + L_4\} \qquad (2)$$

$$u_2 = x - \beta\{(L_2+L_3)/n + L_4\} \qquad (3)$$

$$v_2 = y - \alpha\{(L_2+L_3)/n + L_4\} \qquad (4)$$

The angular offsets (α and β) and the translational offsets (x and y) of the beam is then solved as follows:

$$\beta = \frac{(u_1 - u_2)}{(L_1 - L_2)} * n \qquad (5)$$

$$\alpha = \frac{(v_1 - v_2)}{(L_1 - L_2)} * n \qquad (6)$$

$$x = \beta\left\{\frac{(L_1+L_3)}{n} + L_4\right\} - u_1 \qquad (7)$$

$$y = \alpha\left\{\frac{(L_1+L_3)}{n} + L_4\right\} - v_1 \qquad (8)$$

In addition to the locating parameters of angular offsets and translational offsets calculated above for the beam target, an optional fifth degree of freedom measurement is performed by an example embodiment to establish how the beam struck the sensors. The beams and sub-beams have a cross section which appears as an extended object (e.g., an elliptical shape) when measured by an image sensor. FIG. 6 illustrates such an embodiment in which an elliptical beam cross section 90 is rotated fifteen degrees from vertical. If the beam is intentionally non-axis symmetric, such as an elliptical cross section rather than a circular cross section, the sensor senses an elliptical spot shape, as shown at 92 representing the sensed data of the image sensor. A best fit of the image to an ellipse results in two eigen vectors. The angle between the focal camera axes and the eigen axes represents the rotational offset of the camera boresight axis with respect to the beam target, which is representative of the work piece. As shown in FIG. 6, the major axis 94 of the ellipse is rotationally offset from the camera boresight axis 96 by angle θz. Establishing the offset angle provides another point of reference between the camera system coordinate system and the workpiece by providing the third angular offset from three mutually orthogonal axes.

The embodiment of FIG. 5 includes an aperture equivalent to the field of view. However, the field of view may be smaller than practical in some applications. As such, an example embodiment includes a beam expander/condenser to broaden the field of view of the camera system. FIG. 7 illustrates such an embodiment in which a camera system 100 as described with respect to FIG. 5 is implemented with a beam condenser 102 of a predefined magnification. The incoming afocal beam 60 is offset by Ox relative to the boresight centerline 74, which is maintained as the beam exits the beam condenser 102. The optics of the camera system including the first sensor 70 and second sensor 72 operate as described above with respect to FIG. 5.

FIG. 8 illustrates a camera system 100 in use with a beam expander/condenser 102 to receive a beam 60 from a self-aligned bore emitting device 26 embedded in a bore of a workpiece 18. In addition to the camera system 100 there is a laser module 120 and a diffractive optical element (DOE) 122. The DOE 122 is used to convert the laser of the laser module 120 to an elliptical cone beam 124 with centerline 126. At a predetermined angle, the projection from the DOE 122 appears circular, and at a predetermined height or distance from the workpiece 18, the DOE projected ellipse is slightly larger than the target, which in this case is the self-aligned bore emitting device 26. The DOE 122 is at a fixed location relative to the camera system 100 such that a projected ellipse can be used to establish an angle of the camera system with respect to the workpiece through measurement of the ellipse. The ellipse projected on the workpiece 18 serves as an optical guide for positioning the camera system 100 with respect to the workpiece 18 and the self-aligned bore emitting device 26.

While example embodiments described above use a beam emitted from a target to establish a position and orientation of the target or of a workpiece feature represented by the target, example embodiments optionally include a camera system that projects an output beam to be reflected back to the camera system as an input beam. Such a system includes additional optics as described further below.

FIG. 9 illustrates an example camera system that projects an output beam to be reflected back to the camera system as an input beam, in accordance with example embodiments. As seen in FIG. 9, camera system 100 includes: a housing 180 defining an aperture 114 to receive a collimated input beam 160; an optical boresight having a centerline 174; a first sensor 170 and a second sensor 172 serially positioned relative to the centerline 174 of the optical boresight; a first surface 164 comprising a beam splitter configured to split the collimated input beam into a first sub-beam 165 and a second sub-beam 167, and direct the first sub-beam of the input beam to the first sensor 170; a second surface 166 comprising a reflective surface configured to reflect the second sub-beam 167 and direct the second sub-beam to the second sensor 172; and a computing device 134 in communication with the first sensor 170 and the second sensor 172, the computing device configured to determine one or more offsets of the input beam 160 from the centerline based on data received from the first sensor and the second sensor. The computing device 134 in communication with the sensors 170, 172 of the camera system, including the processing circuitry 36, user interface 40, memory 38, communication interface 42 as shown in FIG. 4, may be contained within the camera housing, or outside the camera housing.

Within examples, computing device 134 is the same as or substantially the same as computing device 34 depicted in and described with reference to FIG. 4.

The camera system 100 is also configured to project an output beam to be reflected back to the camera system 100 as the input beam 160. FIG. 9 illustrates a camera system that includes a beam generator 130 to project a randomly polarized beam 132, which includes S-aligned waves and P-aligned waves, to a collimating optic 135, which directs the collimated output beam 136 through the camera system 100. The collimated output beam 136 passes through a linear polarizing P-pass coating of surface 166. In doing so, a portion of the beam, namely the S-aligned waves of the beam, are reflected along beam path 140 to a beam dump 142. The beam dump 142 merely absorbs the waves without reflecting the received beams back into the optics of the camera system 100 which could affect accuracy of the measurements.

The portion of the collimated output beam 136 that passes through the linear polarizing P-pass coating of surface 166 are P-aligned waves of the beam at 144. A portion of the P-aligned waves of beam 144 pass through a beam-splitting half-mirror surface 164 as beam 148, while another portion of beam 144 is split and directed along path 150 to the beam dump 142. The remaining output beam 148 then passes through a quarter wave plate 152, which causes the output beam from the camera system to be a clockwise circularly polarized wave output beam 154 exiting the camera system, directed toward target 156.

The output beam 154 is considerably more broad than the target as the target is a very small reflective surface. The target of an example embodiment is on the order of millimeters or fractions thereof, while the output beam may be an order of magnitude larger or more. The target 156 reflects a small portion of the output beam 154 back to the camera system 100. The reflected beam from the target 156 becomes the input beam 158 to the camera system 100. The input beam 158, as it is reflected from the clockwise circularly polarized output beam 154 becomes counter-clockwise circularly polarized. The input beam 158 passes through the quarter wave plate 152, which causes the counter-clockwise circularly polarized wave to become S-aligned, substantially cancelling the circular polarization imparted to the output beam 154 by the quarter wave plate 152. The S-aligned input beam 160 strikes the beam-splitting half-mirror surface 164, from which the beam is split and a portion of the beam or a sub-beam 165 is reflected to first sensor 170. The portion of the beam 161 that passes through the half-mirror surface 164 reaches the polarizing P-pass coating of surface 166. As the input beam became S-aligned in entering the camera system 100 through the quarter wave plate 152, the S-aligned beam along path 161 is reflected in its entirety off of the P-pass coating of surface 166 as sub-beam 167 to reach the second sensor 172.

The camera system 100 of FIG. 9 uses the sensed data of sensors 170 and 172 in the same manner as described above with respect to FIG. 5 to establish the translation offsets of the input beam from the centerline and angle offsets of the input beam from the centerline.

According to some embodiments, at least one of the first and second sensors is a pixelated imager with the beam splitting reflective surfaces appropriately spaced. Another of the first and second sensors of an example embodiment is a time-of-flight pixelated sensor with the beam splitting reflective surfaces appropriately spaced. The output from the time-of-flight pixelated sensor is provided to a control system of the camera system, such as the computing device 34 of FIG. 5, where three-dimensional time-of-flight sensor electronics are used to determine a distance of the target from the camera system. The three-dimensional time-of-flight sensor electronics are in communication with or in control of the beam such that time-of-flight of the beam is calculated through modulation of the output beam and processing of the reflected input beam. While using at least one sensor as a pixelated imager with the beam splitting surfaces appropriately spaced provides for determination of five degrees of freedom of the target as described above with respect to FIG. 5, incorporating the time-of-flight pixelated sensor with three-dimensional time-of-flight sensor electronics provides for determination of the z-axis offset or distance of the camera system from the target. Factoring in the z-axis offset with the x- and y-axis offsets identified above, and using the three angular offsets of the three mutually orthogonal axes provides for accurate measurement of six degrees of freedom of the target.

Incorporating time-of-flight to establish the z-axis offset requires additional calculations. Referring now to FIG. 10, if the first sensor 270 is a pixelated sensor and measures image centroid at $(u_1, v_1)$ from the sub-beam 265 reflected from surface 264 of input beam 260, and the second sensor 272 is a pixelated time-of-flight sensor that measures image centroid $(u_2, v_2)$ from sub-beam 267 reflected from surface 266 of input beam 260, and range r to the target established by the time-of-flight calculations. According to an example embodiment, the offsets of the target relative to the boresight centerline 274 of the camera system are calculated as follows:

$$\theta x = 0.5 * \arctan\left((v1 - v2) * \left(\frac{ng}{(L1 - L2)}\right)\right) \quad (9)$$

$$\theta y = 0.5 * -\arctan\left((u1 - u2) * \left(\frac{ng}{(L1 - L2)}\right)\right) \quad (10)$$

$$x = \tan(\beta) * \left\{\frac{(L_2 + L_3)}{ng} + \frac{(L_4)}{na}\right\} - u1 \quad (11)$$

$$y = \tan(\alpha) * \left\{\frac{(L_1 + L_3)}{ng} + \frac{(L_4)}{na}\right\} - v1 \quad (12)$$

$$z = \sqrt{r^2/na - x^2 - y^2 - L2^2 - L3^2 - L4^2} \quad (13)$$

na=index of refraction for air
ng=index of refraction for glass path

While the embodiments of FIGS. 5 and 9 depict linearly arranged optics, embodiments may be made of a more compact form factor, including a form factor in which the aperture is at an angle with respect to the boresight centerline. FIG. 11 illustrates an example of a compact form factor for a camera system 100 having components similar to the embodiment of FIG. 9. As shown, the beam source 300 is projecting a beam along a first axis toward second surface 366 and first surface 364, after which the beam encounters a reflecting mirror disposed at a forty-five degree angle causing the beam to bend ninety degrees. The target 202 in this embodiment is located along an axis that is orthogonal to the beam projection axis. The reflected input beam 360 encounters the same reflecting mirror 304, thereby folding the input beam at ninety degrees before the input beam is received at the second, beam-splitting surface 364 and the second surface 366 along path 216 to be reflected onto the first sensor 370 and the second sensor 372. The form factor illustrated in FIG. 11 may be used in tighter quarters than those of embodiments of FIGS. 5 and 9, while providing the same effective measurement.

FIG. 12 is a flowchart of a method for aligning a target location in space, and more particularly, for measuring a target location within six degrees of freedom to a very high accuracy using an optical camera system. As shown at 400, a collimated input beam is received at an aperture. The collimated input beam may be received from a beam source outside of the camera system, such as a self-aligned bore emitting device as illustrated in FIGS. 1, 3, and 8 or the input beam may be reflected from an output beam of the camera sensor as depicted in FIG. 9. The input beam is split at a beam splitting first surface into a first sub-beam and a second sub-beam as shown at 402. The first sub-beam of the illustrated embodiment is received at the first sensor at 404, while the second sub-beam is received at the second sensor at 406. One or more offsets of the input beam from the centerline is determined from data received from the first sensor and the second sensor as shown at 408. At least one angular offset of the input beam from the centerline is determined at 410 based on data received from the first sensor and the second sensor.

As described above, FIG. 12 illustrates a flowchart of a system 30, method, and computer program product according to example embodiments of the present disclosure. It will be understood that each block of the flowcharts, and combinations of blocks in the flowcharts, may be implemented by various means, such as hardware, firmware, processor, circuitry, computing device, and/or other devices associated with execution of software including one or more computer program instructions. For example, one or more of the procedures described above may be embodied by computer program instructions. In this regard, the computer program instructions which embody the procedures described above may be stored by the memory 38 of a system 30 employing an embodiment of the present disclosure and executed by the processing circuitry 36 of the system 30. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art having the benefit of the teachings presented in the foregoing descriptions and the associated drawings. Therefore, it is to be understood that the present application is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A camera system for position and orientation measurement, the camera system comprising:
    a housing defining an aperture to receive a collimated input beam;
    an optical boresight having a centerline;
    a first sensor and a second sensor serially positioned relative to the centerline of the optical boresight;
    a first surface comprising a beam splitter configured to split the collimated input beam into a first sub-beam and a second sub-beam, and direct the first sub-beam of the input beam to the first sensor;
    a second surface comprising a reflective surface configured to reflect the second sub-beam and direct the second sub-beam to the second sensor; and
    a computing device in communication with the first sensor and the second sensor, the computing device configured to determine one or more offsets of the input beam from the centerline based on data received from the first sensor and the second sensor.

2. The camera system of claim 1, wherein the computing device is further configured to:
    determine a location and irradiance of the first sub-beam of the input beam received by the first sensor; and
    determine a location and irradiance of the second sub-beam of the input beam received by the second sensor.

3. The camera system of claim 1, where the computing device is further configured to, based on data received from the first sensor and the second sensor, determine two translation offsets of the input beam from the centerline and two angle offsets of the input beam from the centerline.

4. The camera system of claim 1, where the computing device is configured to determine two translation offsets of the input beam from the centerline and two angle offsets of the input beam from the centerline based on formulas, wherein the formulas use as input two-dimensional coordinates of the first sub-beam on the first sensor and two-dimensional coordinates of the second sub-beam on the second sensor.

5. The camera system of claim 4, wherein the formulas further use as inputs geometry of the camera system to determine the two translation offsets of the input beam from the centerline and the two angle offsets of the input beam from the centerline.

6. The camera system of claim 1, further comprising a laser module and diffractive optical element to project a ring for aligning the optical boresight centerline with the input beam.

7. The camera system of claim 1, further comprising a beam condenser positioned between the aperture and the first surface to receive the input beam and condense the input beam entering the aperture.

8. The camera system of claim 1, wherein the first sensor is positioned adjacent to the first surface and wherein the second sensor is positioned adjacent to the second surface.

9. The camera system of claim 1, wherein the second surface comprises a linearly polarizing beam splitter, wherein the aperture is positioned at a first end of the camera system, the camera system further comprising:
    a laser source positioned at a second end of the camera system, opposite the aperture; and
    a collimating optic, where the collimating optic is positioned to direct a collimated output beam toward the linearly polarizing beam splitter, and wherein the linearly polarizing beam splitter directs a portion of the collimated output beam toward the beam splitter of the first surface through which passes a portion of the collimated output beam.

10. The camera system of claim 9, further comprising a quarter wave plate disposed proximate the aperture, wherein the linearly polarizing beam splitter comprises a linear polarizing P-pass coating, wherein the first surface comprises a half-mirror coating.

11. The camera system of claim 10, wherein the collimated output beam is randomly polarized before passing through the P-pass coating, wherein a P-aligned output beam passes through the P-pass coating of which half of the P-aligned output beam passes through the half-mirror coating to exit the camera system through the quarter wave plate as an output beam of clockwise circularly polarized waves.

12. The camera system of claim 11, wherein a reflection of the output beam of clockwise circularly polarized waves comprises an input beam of counter-clockwise circularly polarized waves received through the quarter wave plate to become an input beam of S-aligned waves, wherein half of the S-aligned waves of the input beam are reflected from the half-mirror coating to the first sensor and half of the S-aligned waves pass through the half-mirror coating to reach the P-pass coating of the second surface, wherein the half of the S-aligned waves that reach the P-pass coating are reflected to the second sensor.

13. The camera system of claim 1, wherein at least one of the first sensor and the second sensor comprise a pixelated imager and a time-of-flight pixelated sensor, wherein the computing device is configured to determine distance of the camera system from a target based on data obtained by the time-of-flight pixelated sensor in response to modulation of a laser source.

14. A method for position and orientation measurement using a camera system having an optical boresight centerline, the method comprising:
    receiving, at an aperture, a collimated input beam;
    splitting the input beam at a first surface comprising a beam splitter into a first sub-beam and a second sub-beam;
    receiving, at a first sensor, the first sub-beam;
    receiving, at a second sensor, the second sub-beam; and
    determining one or more offsets of the input beam from the optical boresight centerline based on data received from the first sensor and the second sensor.

15. The method of claim 14, further comprising:
    determining a location and irradiance of the first sub-beam of the input beam received by the first sensor; and
    determining a location and irradiance of the second sub-beam of the input beam received by the second sensor.

16. The method of claim 14, further comprising:
determining two translation offsets of the input beam from the optical boresight centerline and two angle offsets of the input beam from the optical boresight centerline based on data received from the first sensor and the second sensor.

17. The method of claim 16, wherein determining the two translation offsets of the input beam from the optical boresight centerline and two angle offsets of the input beam from the optical boresight centerline based on data received from the first sensor and the second sensor comprises:
identifying on the first sensor a two-dimensional coordinate location of the first sub-beam;
identifying on the second sensor a two-dimensional coordinate location of the second sub-beam;
using the two-dimensional coordinate location of the first sub-beam and the two-dimensional coordinate location of the second sub-beam as inputs to formulas for each of the two translation offsets and each of the two angle offsets; and
solving the formulas to obtain the two translation offsets and the two angle offsets.

18. The method of claim 17, wherein the formulas for the two translation offsets and the two angle offsets are established based on a geometry of the camera system.

19. The method of claim 14, further comprising:
projecting, with a laser module and a diffractive optical element, a ring for aligning the optical boresight centerline with the input beam.

20. The method of claim 14, further comprising:
projecting a collimated output beam through the first surface and a second surface, and through a quarter-wave plate to polarize the output beam as one of clockwise circularly polarized waves or counter-clockwise circularly polarized waves; and
wherein receiving, at the aperture, the collimated input beam comprises receiving, at the aperture, the collimated input beam reflected from a target as the other of the clockwise circularly polarized waves or counter-clockwise circularly polarized waves through the quarter wave plate to align polarization of the collimated input beam.

21. The method of claim 14, further comprising:
determining an angular offset of at least one of the first sub-beam or the second sub-beam relative to the respective first sensor or second sensor in response to the first sub-beam or the second sub-beam having a non-axis symmetrical beam cross section, wherein the angular offset is derived from a major axis of the non-axis symmetrical beam cross section with respect to a coordinate system of the respective first sensor or second sensor.

22. A computer program product for position and orientation measurement, the computer program product comprising at least one non-transitory computer-readable storage medium having computer-executable program code instructions stored therein, the computer-executable program code instructions comprising program code instructions to:
receive, at a first sensor, a first sub-beam of a collimated input beam received through an aperture;
receive, at a second sensor, a second sub-beam of the collimated input beam;
determine a location and irradiance of the first sub-beam of the input beam received by the first sensor;
determine a location and irradiance of the second sub-beam of the input beam received by the second sensor; and
determine one or more offsets of the input beam from a centerline based on data received from the first sensor and the second sensor.

23. The computer program product of claim 22, further comprising program code instructions to project, with a laser module and a diffractive optical element, a ring for aligning the aperture with the input beam.

24. The computer program product of claim 22, wherein the program code instructions to determine one or more offsets of the input beam from the centerline based on data received from the first sensor and the second sensor comprises program code instructions to determine two translation offsets of the input beam from the centerline and two angle offsets of the input beam from the centerline based on data received from the first sensor and the second sensor.

25. The computer program product of claim 24, further comprising program code instructions for using time-of-flight data from at least one of the first sensor or the second sensor to identify at least one further offset.

26. A camera system for position and orientation measurement, the camera system comprising:
a camera system housing comprising a boresight centerline;
a laser source to project a laser proximate a first end of the camera system housing along the boresight centerline;
a quarter wave plate proximate a second end of the housing along the boresight centerline;
a collimating optic disposed between the laser source and the quarter wave plate along the boresight centerline;
a first surface comprising a half-mirror coating arranged at an angle relative to the boresight centerline and positioned between the collimating optic and the quarter wave plate;
a second surface comprising a linearly polarized coating arranged at an angle relative to the boresight centerline and positioned between the collimating optic and the first surface;
a first sensor configured to receive an input beam reflected from the first surface; and
a second sensor configured to receive the input beam reflected from the second surface.

27. The camera system of claim 26, wherein the linearly polarized coating comprises a P-pass coating, wherein an output beam emitted from the laser is randomly polarized before passing through the P-pass coating, wherein a P-aligned output beam passes through the P-pass coating of which half of the P-aligned output beam passes through the half-mirror coating to exit the camera system through the quarter wave plate as an output beam of clockwise circularly polarized waves.

28. The camera system of claim 27, wherein a reflection of the output beam of clockwise circularly polarized waves comprises an input beam of counter-clockwise circularly polarized waves received through the quarter wave plate to become an input beam of S-aligned waves, wherein half of the S-aligned waves of the input beam are reflected from the half-mirror coating to the first sensor and half of the S-aligned waves pass through the half-mirror coating to reach the P-pass coating of the second surface, wherein the half of the S-aligned waves that reach the P-pass coating are reflected to the second sensor.

29. The camera system of claim 26, further comprising a computing device caused to identify two translation offsets and two angular offsets of a target in response to an input beam reflected from the target being received at the first sensor and the second sensor.

30. The camera system of claim 29, wherein the causing the computing device to identify two translation offsets and two angular offsets of a target is performed in response to identifying coordinates of the input beam received at the first sensor and coordinates of the input beam received at the second sensor, and calculating the two translation offsets and two angular offsets based on geometry of the camera system.

\* \* \* \* \*